Jan. 1, 1974 — J. H. FORKNER — 3,782,966
METHOD OF MAKING A BAKERY PRODUCT HAVING AN EXPANDED FILLING
Original Filed Nov. 3, 1969
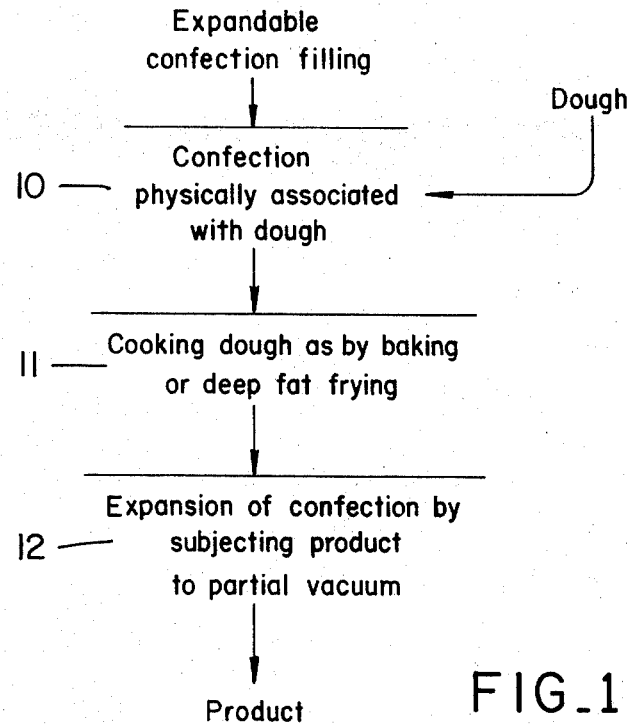
FIG_1
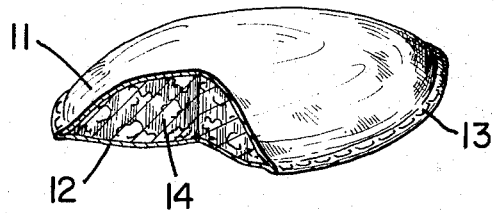
FIG_2
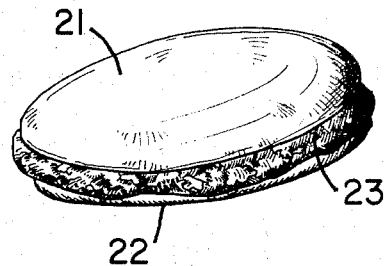
FIG_4
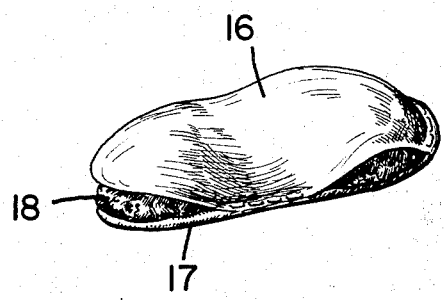
FIG_3
INVENTOR.
JOHN H. FORKNER
BY Flehr, Hohbach, Test, Albritton and Herbert
ATTORNEYS United States Patent Office 3,782,966
Patented Jan. 1, 1974

3,782,966
METHOD OF MAKING A BAKERY PRODUCT HAVING AN EXPANDED FILLING
John H. Forkner, 2116 Mayfair Drive W., Fresno, Calif. 93703
Continuation of abandoned application Ser. No. 873,581, Nov. 3, 1969. This application Sept. 7, 1971, Ser. No. 178,381
Int. Cl. A21d 13/00
U.S. Cl. 426—275
8 Claims

ABSTRACT OF THE DISCLOSURE

A bakery product comprising a cooked (e.g., by baking or deep-fat frying) dough physically associated with an expanded confection filling. Also a method of manufacture in which the dough and filling are first subjected to a cooking operation to cook the dough and thereafter the dough and filling subjected to a partial vacuum to expand the filling. In some instances the expanded filling can be further processed to effect partial collapsing of the filling.

This is a continuation of application Ser. No. 873,581 filed Nov. 3, 1969, now abandoned.

CROSS-REFERENCE TO RELATED APPLICATION

Reference is made to applicant's copending application Ser. No. 248,748, filed Apr. 28, 1972, which is a continuation-in-part of subject matter disclosed herein.

BACKGROUND OF THE INVENTION

This invention relates generally to bakery products of the type having dough and filling portions, and to methods for their manufacture.

In the past, puffed or expanded confection balls have been made by subjecting a confection mix containing an expandable material (e.g., corn sugar) to a partial vacuum whereby the volume is greatly expanded and the moisture content reduced. Such puffed products do not have the properties necessary to retain their volume when used as a component of baking dough products. In my Pat. No. 2,998,318, I have disclosed fruit flavored products that are expanded by vacuum treatment and which are formulated to have sufficient strength for use in various food products and mixes, including moist bakery dough. However, in that instance moisture from the dough is absorbed by the expanded confection to convert the latter to a soft mass with a reduction in volume to that of the original unexpanded mass. Thus although expanded confections have been known and used in bakery doughs and other products, they have not been used as separately identifiable expanded components in baked products, with the expanded form being retained. Also they have not been expanded while in physical contact with a cooked dough to provide integrated or composite products.

SUMMARY OF THE INVENTION AND OBJECTS

It is an object of the invention to provide bakery products of the above character which are characterized by an expanded confection filling.

Another object of the invention is to provide a novel method for manufacture of bakery products which is characterized by the fact that the dough is cooked before the filling is expanded and thereafter the filling is applied and expanded in contact with the cooked dough.

Another object is to provide a method of the above character in which the product comprising dough and filling is processed to provide an overall increase in volume.

Another object of the invention is to provide novel bakery products of the turnover or tart type which have an inner confection filling that is expanded and which has sufficient strength when properly packaged to remain in expanded form until it is consumed.

Another object of the invention is to provide a novel method for the manufacture of the above turnover type of products, the method being characterized by exposure of the product to partial vacuum immediately after the dough has been cooked as by baking or deep-fat frying, the vacuumizing serving to expand the filling and dehydrate both the cooked dough and the filling.

In general, the new article of manufacture comprising the present invention consists of at least one layer of cooked dough having a confection filling in physical contact with and adhered to one surface of the same, the filling having corn sugar as its major ingredient. The filling is cellular in form by virtue of controlled expansion, and its moisture content is relatively low (e.g., less than 2%) and comparable to that of the cooked and vacuum dehydrated dough. The method of manufacture involves the physical incorporation of the filling in unexpanded form with the dough, after which the dough is cooked as by baking or fat frying. The product with the cooked dough is then subjected to a partial vacuum to effect a controlled amount of expansion of the filling.

BRIEF DESCRIPTION OF THE DRAWINGS

FIG. 1 is a flow sheet illustrating steps of my method;
FIG. 2 is a perspective view partly in section showing one product made by the method;
FIG. 3 is a perspective view illustrating another product; and
FIG. 4 is a perspective view illustrating another product.

DESCRIPTION OF THE PREFERRED EMBODIMENTS

As illustrated in the flow diagram, the invention involves use of an expandable confection type of filling such as one having a substantial amount of corn sugar solids. As will be presently explained, this filling may vary as to flavoring and composition. The dough employed may be one such as is used in the manufacture of doughnuts, pie crusts or turnovers. In general, the formulation of the dough should be such as to provide sufficient strength for the final product, thus permitting handling and packaging without breakage. To physically associate the dough with the confection filling, the dough may be sheeted and shaped to a form suitable for receiving the filling. For example, a sheet of dough can be provided with a raised perimeter to provide a dished or cuplike shape, whereby the confection may be deposited within the same. In the manufacture of tarts, for which my invention is particularly applicable, a sheet or strips of dough are applied over the top of the filling, and the perimeter of the top sheet compressed to adhere to the perimeter of the lower sheet. Also conventional turnover mechanisms are available which sheet the dough, position it to receive the deposit of filling and then with a rotary motion fold over the dough with crimping and trimming. The dough at this time is uncooked, and the confection is in unexpanded form, with one surface of the same in physical contact with one surface of the dough layer. In the next step 11 this combination of dough and filling is subjected to a cooking operation to cook the dough. Cooking can be carried out by conventional baking or by conventinal deep-fat frying. Deep-fat frying is applicable where the filling is enveloped within the dough.

During cooking of the dough, its moisture content is reduced and at least the surface layers of the filling are heated to a temperature comparable to the temperature of the cooked dough. This serves to provide fusion and stickiness, causing good adhesion between the filling and the dough.

After cooking the dough as explained above, the product is subjected to a partial vacuum in step 12 to cause the filling to be expanded in cellular form. At the same time moisture is evaporated from the filling and the dough to provide a final moisture content of the order of 5% or less (e.g., 1–5%). Normally vacuum should be applied while the product is at an elevated temperature of the order of from 170 to 250° F. In the event there is a time lapse between baking and the vacuum treatment, during which the product cools to ambient room temperature, then the product may be reheated before vacuumizing. Also in the vacuumizing treatment it is desirable to supply additional heat, as by heating the shelves upon which the product is disposed to a temperature of the order of from about 120 to 260° F. If it is possible to eliminate a period of storage and cooling between baking of the dough and the vacuum treatment, then the product can be directly transferred from the baking oven or frying mechanism to the vacuum chamber, while the product is at a temperature of the order of 180 to 250° F. With this procedure, heating before applying a partial vacuum can be omitted. Another procedure which can be followed where the baked products are permitted to cool to ambient temperature before the vacuum treatment, is to heat the supporting shelves of the vacuum dryer to a temperature of the order of 170° F. and then place the product at ambient temperature on the shelves. After a preheating of about 10 minutes, the vacuum is applied and the temperature of the shelves increased to a higher value of say 240 to 250° F. Except as hereinafter described in most instances where the product as a whole is expanded in volume, I convey the product directly from the oven to the vacuum equipment without intermediate heating. At that time the product may be in a baking pan or in part or all of the final package in which it is marketed.

Irrespective of the manner in which heat is applied and continued during the vacuum treatment, the vacuum applied should be such as to effect the desired expansion over the time period of the vacuum treatment, and also it should be sufficient to reduce the moisture content of the filling and dough to a relatively low value (e.g., ½ to 5%). In practice the applied partial vacuum has been of the order of 28 to 30 inches mercury column. The time period for carrying out step 12 will vary depending upon the size of the product and the character of the filling, but in general good results have been secured by applying vacuums of the order previously mentioned for periods of the order of ½ to 2 hours, with shelf and temperatures within the range of 170 to 260° F.

With respect to optimum values, it is desirable to use shelf temperatures during vacuumizing above 120° F., the optimum being about 240° F., and a partial vacuum corresponding to about 29½ inches mercury column. At the end of the vacuumizing treatment the product can be cooled simply by removing it from the equipment chamber and permitting it to cool to ambient temperature. However, I prefer to reduce the shelf temperature of the equipment to about 80 to 150° F. before the cycle is completed so that the product is removed at a somewhat lower temperature level, after which it is permitted to cool to ambient temperature.

Assuming that the product has upper and lower layers of dough with the confection filling between the same, expansion of the filling to attain the desired cellular form serves to raise the upper cooked dough layer and thus increase the overall volume of the product. Assuming use of conventional pie doughs, the upper layer at this time has sufficient flexibility to permit such flexing without breakage, particularly when vacuum is applied immediately to the product after baking and while still hot.

In some instances equipment limitations may require storage and cooling between cooking of the dough and expansion of the filling. However, it is preferable to convey the product from the dough baking step to the vacuum equipment without intervening storage or cooling. This contributes to flexibility of the dough walls to accommodate expansion of the filling and makes for an attractive convex upper surface.

The product obtained by the method described above consists of at least one layer of cooked dough together with a confection filling adhered to at least one surface of the dough and having a cellular structure. The moisture content of the filling is comparable to that of the baked and vacuum dehydrated dough, namely of the order of ½ to 5%. As previously explained, the filling becomes adhered to the surface of the cooked dough during the cooking step 11, at this time the filling becomes adhesive. Also it is adhesive in the vacuum equipment with further bonding to dough with which it is in contact.

With respect to the composition or formulation of the filling, it should have a substantial amount of sugar or sugar syrup which is capable of forming an expanded cellular mass when heated to an elevated temperature and subjected to a vacuum. Also the filling should retain its expanded form after cooling and dehydration. A number of sugars, sugar syrups and sugar containing materials have this characteristic, including commercial corn syrup (containing dextrose, maltose and dextrines, and refined corn sugar (dextrose), and malt syrup and malt sugar. Also malted milk, which contains casein and lactose, possesses the same characteristic. Mixtures of these materials can be used, as for example, corn syrup and malted milk. In general the filling may consist of 50% or more of such expandable materials. The various confection formulations disclosed in my Pat. 2,998,318 can also be employed. A wide variety of natural and artificial flavors and flavor imparting ingredients can be added in minor amounts, including fruit flavors, cheese, coconut, nuts, dried products like meat and shrimp, and the like. The filling expands to a volume more than twice the filling material before expansion.

In preparing the expandable filling, it can be rolled while warm into sheets that are then chilled to facilitate subdividing and handling. Then the sheets can be chilled to a temperature of about 60° F. or lower to make them brittle, subdivided into masses of the desired shape and size, and then stored at a temperature below 60° F. pending their use. Such masses can be deposited on the dough while chilled or at ambient temperature.

In the foregoing it is assumed that the confection filling is incorporated with the uncooked dough as a single mass. However, in some instances it is desirable to deposit the filling in the form of discrete or divided material which fuses or liquifies during baking to form an agglomerate of expandable material. Such a discrete filling can be compressed into agglomerated wafers or pellets by warming the material to cause the particles to soften and then compressing the particles together. Various additives can be mixed with such a discrete filling, as for example, malted milk powder or other discrete edible material. When it is desirable to have the discrete filling in the form of a free flowing material at ambient room temperature, the particles may be coated or blended with certain materials such as milk powder, granulated sugar, chocolate, hard fat, and the like.

To prepare a discrete confection filling, the confection mix, which may be in sheet form, is cooled to a temperature such that the material becomes brittle and can be readily subdivided as by use of a conventional hammer mill. Confection fillings as previously described and as specified in the subsequently described examples, normally become brittle at ambient room temperature. In the event the material is not sufficiently brittle at room temperature, it can be chilled to lower temperature levels to produce the desired brittleness. In instances where discrete additives are mixed with the discrete confection filling, the additive can be such as to increase the degree of expansion during vacuumizing treatment, or it may reduce or inhibit the expansion.

Two or more expandable discrete materials may be mixed together to form the expanded filling. One of such materials may have a low moisture content (e.g. 0–3%) and may be absorbent whereby it absorbs some of the moisture content of other expandable material during processing.

For example, one of the discrete materials may be made as previously described and a second material may be malted milk powder. During fusion the particles of the mix form an agglomerated mass. After expansion of this mass, the expanded malted milk is separately identifiable. Such products are novel in appearance and have good eating properties. In the event such a product is exposed to moist atmosphere with some subsidence of the expanded material, the presence of two or more materials in this manner tends to minimize the extent of subsidence.

The amount of expansion of the filling can be controlled by its formulation and by control of such factors as the temperatures during vacuumizing, the degree of vacuum applied and the time period during which the product is subjected to the vacuum. It is also possible to obtain a predetermined and controlled amount of collapsing of the filling after expansion. In some instances the formulation of the filling will be such that a partial collapsing occurs while being subjected to the partial vacuum.

When the product is used by the consumer, it may be eaten as such, or other materials in liquid, semi-liquid or paste form may be added. For example, reference can be made to additives such as jams or marmalade, ice cream, berries in juice, tomato paste and the like. The moisture content of such additives may be absorbed to a certain extent by the expanded filling, thus causing some modification of its cellular structure and some collapsing to form a consumer product having novel eating properties. The product may be rebaked or served in conjunction with other additives in the manner of dumplings, casseroles, raviolis and pizza with partial or complete rehydration of the expanded porous substance. Stabilizers may be included with the expanded substance to become effective with subsequent rehydration. When the additive has a substantial liquid content, the filling after rehydration tends to disintegrate and disperse in the liquid. This provides a distinctive appearance in that the disintegrated and somewhat dispersed filling, because of its entrained air content, remains at the surface in the form of distinct islands or ribbons.

Examples of my invention are as follows:

EXAMPLE 1

A conventional piecrust dough was prepared using 100 parts flour and 40 parts of shortening and with the usual formula and technique described in standard bakery cookbooks.

The formulation of the filling was as follows:

| | Lbs. |
|---|---|
| Dry corn sugar | 100 |
| Glucose syrup | 100 |
| Malt sugar (diamalt) | 30 |
| Granulated sugar | 50 |
| Hard fat (melting point 132° F.) | 20 |
| Malted milk powder | 30 |
| Salt | 1 |

The above filling ingredients were blended together and added to the glucose, after the latter had been heated to boiling temperature. The moisture content was about 6%, being largely imparted by the glucose. During blending, heat was supplied to maintain the temperature at or near 212° F. Before the mix commenced to harden it was removed from the mixer and then sheeted to form sheets about 3/16 inch thick. The sheets were scored along lines extending at right angles to each other, the lines in one direction being 2" apart and in the other direction, 1" apart. These sheets were then permitted to cool and set at ambient room temperature (70° F.) whereby they became brittle. Thereafter the temperature was reduced to about 60° F. and the brittle sheets passed through a breaking roll to cause breakage along the score lines, thereby forming wafers each about 3/16" thick, 1" wide and 2" long. A sheet of the dough measuring about 3" wide and 4" long was placed on a baking pan and one of the wafers was placed on the central region of the dough sheet. A top sheet of dough was then placed over the filling wafer and lower dough and trimmed off in such a manner as to provide a peripheral margin overlapping a peripheral margin of the lower sheet. The upper surface of the margin of the lower sheet was wetted to insure adhesion of the margins in baking and to avoid separation during the subsequent vacuum treatment. The pan containing this turnover or tart was then placed in an oven having an air temperature of 450° F. and baked for a period of 8 minutes, during which time the dough was baked and the filling liquified. The pan and turnover were then transferred as rapidly as possible to the shelf of a vacuum dryer, the shelf having been preheated to 240° F. The vacuum dryer was then evacuated to a partial vacuum equivalent to 29½" mercury column and maintained at that value for about 1½ hours. The temperature of the turnover when the vacuum was first applied was about 200° F. At the end of this vacuum treatment the turnover was cooled to about 150° F. over a period of about 15 minutes and thereafter the vacuum was broken and the pan and turnover removed. After cooling to ambient temperature, it was found that the filling had expanded several times its original volume, being of the order of 1" thick. The peripheral seams between the upper and lower margins of the dough were retained, and it was evident that the upper dough layer had been bulged upwardly during final expansion of the filling. A lesser bulge was evident on the lower plane.

The produced in the foregoing Example 1 had sufficient strength to withstand packaging without breakage. The moisture content of the expanded filling and the baked dough was less than 2% and of the order of 1%. When consumed, it was found that the filling was crunchy or friable, which was attributed to its cellular structure and low moisture content. It was found that the product had good keeping properties when packaged in conventional laminated plastic film bags or containers capable of protecting the product from absorption of atmospheric moisture. In general the product was palatable and an attractive product for the consumer trade.

The baking operation for the foregoing Example 1 was carried out by use of a conventional kitchen oven. However, it was evident that the various operations carried out in Example 1 were amenable to automation and well adapted to commercial equipment.

EXAMPLE 2

The same dough and filling formulas were used as in Example 1. However, the filling sheets were subdivided in their chilled brittle state to particles having a screen size of minus 8 mesh. This discrete confection filling was blended with malted milk powder and granulated sugar at ambient temperature in the ratio of 25% (of the weight of the confection filling) malted milk and 15% granulated sugar (by weight). This provided a combined average moisture content of 4% compared to 6% for the confection filling. This mixture was then formed into wafers each measuring about 2" long and 1" wide and weighing about 15 grams, by compression after softening by heating to 110° F. It was noted that fusion of the malted milk powder had served to attach it to the other material of the wafer. These agglomerated wafers were then used in the tarts in place of the wafers used in Example 1. Because of the lower moisture content of the malted milk powder and granulated sugar which absorbed some moisture from the confection filling material, lateral flow of the wafer during heating and expansion was noticeably restricted. This was attributed to the abutment-like effect of the malted milk in inhibiting spreading in contrast with the homogeneous filling used in Example 1. The restriction of lateral flow minimized leakage or flow of fused material from the perimeter seams of the tart. In the vacuum oven the filling expanded with even greater force than the material in Example 1, which I attributed to the lowered moisture content and the added malted milk. This accentuated expanding force was evidenced by greater spread or bulging of the side walls of the tart with the force being so great as to provide a significant concave contour of the under dough as well as the more easily developed convex form of the upper dough. The final filling had a cellular structure that was finer and more uniform than Example 1. The filling was sweeter due to the presence of the malted milk. The malted milk retained the general distribution pattern that it had before expansion, and its characteristic flavor was more apparent than was provided by the homogeneous mix of malted milk with other ingredients like corn sugar.

It was noted in connection with Example 2 that additional edible additives could be used with the discrete filling, thus producing a variety of products. Particular materials which were added included dried meat and shrimp, cocoa, nuts, granular dry cheese and various powdered vegetables, and soya products.

EXAMPLE 3

The same formulas were used for the dough and the filling as in Example 2, the filling having a substantial added malted milk content (one-half of total). Likewise the procedure was the same as Example 1 except that after puffing the filling to its maximum volume, which occurred about ½ hour after application of the vacuum, the vacuum was reduced to a value corresponding to 28" mercury column. This reduction in vacuum occurred before the moisture content of the filling had been reduced to cause the filling to set. As a result, the filling partially collapsed, although the shelf temperature was maintained at about 240° F. At the end of the vacuum treatment the product was cooled as in Example 1. It was observed that the final expansion of the filling was less than in either Example 1 or 2, being of the order of twice the original volume. The filling was porous and retained good eating properties after several weeks storage after packaging. One feature of such a product is that if some partial collapsing takes place during distribution or when in the hands of the consumer, the product remains edible and palatable.

It was noted that the characteristics of the final product obtained by separately adding dry moisture absorbent discrete ingredients to the expandable filling pieces were distinctly different than a filling produced by homogeneously intermixing the same amounts of the additive to the filling mix before subdividing the same. In the vacuum treatment step the presence of the added powder developed a uniform structure of fine cells. In this example the filling was expanded to near its possible maximum and then caused to subside a controlled amount. Subsidence took place with uniform contraction of the cells. It was noted that the resulting filling differed from one resulting from direct expansion to the final volume. Particularly, a desired volume could be obtained without critical control factors. More important, the resulting expanded form differed in appearance, physical character and eating properties. It was more stable in resisting subsequent contraction when exposed to the atmosphere. Products exposed to the atmosphere for several weeks remained expanded and edible in contrast to control samples of homogeneous expanded confections of commercial production that collapsed quickly to their original dense unedible state.

The above Example 3 describes a preferred method of expansion and subsiding by vacuum control. For example, the final product can be exposed to a moist atmosphere under such conditions that a controlled amount of subsidence or collapsing occurs. Thereafter the moisture content can be reduced (e.g., to ½ to 2%) by secondary drying before the product is marketed, or in some instances secondary drying may be omitted.

EXAMPLE 4

The procedure was generally the same as in Example 2. However, after forming agglomerated wafers, their temperature was held at about 60° F. to eliminate all adhesiveness. It was observed that such wafers or pellets could be handled by automatic or semi-automatic equipment to facilitate automated manufacture and positioning of the pellets. Some of such wafers were coated with hard fat having a melting point above 80° F. to reduce surface adhesiveness during deposition.

EXAMPLE 5

The procedure was generally the same as in Example 2. However, instead of forming the mixture of discrete filling particles, dry malted milk powder and granulated sugar into agglomerated wafers or pellets, the discrete mixture of materials was deposited directly on the central portion of the tart. During baking it was observed that the sugar seemed to disperse and the malted milk absorbed moisture and fused with the filling as an agglomerate. During subsequent vacuum treatment the filling was expanded and the moisture contents of both the baked dough and the filling were reduced as previously described in connection with Example 1. In general it was found that introduction of the filling in powdered form was suitable for high speed automated operations. Also it was found that the dry additives served to minimize leakage of the fused material in baking. In other words, flow of the fused material from the peripheral portions of the tart was prevented or minimized.

EXAMPLE 6

The procedure was generally the same as Example 5. However, before pressing the margins of the dough layers together, a sealing aid was applied. Various sealing aids were used including moisture, egg white and malt powder. Instead of applying the sealant completely about the perimeter of the tart, it was applied along about one-half of the perimeter. It was found that during baking the perimeters of the dough layers remained sealed together. However, during vacuum expansion that part of the perimeter to which sealant was not applied broke open, thus providing a product giving the appearance of the filling tending to spill out through one side.

As a modification of the above, the margins of the upper and lower dough sheets were not pressed together or otherwise sealed except for their contact incident to preparing the assembly of dough sheets and filling. After baking of the dough the product was held to permit cooling to ambient room temperature whereby the dough became relatively rigid. Subsequent vacuum treatment with heating and dehydration served to expand the filling with complete separation of the margins, thus forming a sandwich-like product having the filling exposed about the perimeter.

EXAMPLE 7

The procedure was generally the same as in Example 4. A sealant was applied to the peripheral margins of the dough layers sufficient to retain the seal only during baking. The tarts were placed in a foil lined tray to form two side-by-side rows each containing three tarts. They were then baked in the same manner as in Example 1. After cooling to about 180° F., the tray with the baked tarts was placed in the vacuum oven with the shelves heated to 240° F. A vacuum corresponding to 29½" mercury column was applied. After 4 minutes of the vacuum treatment, the trays were removed. It was found that the baked top and bottom dough layers of each tart had separated along their margins and that some of the filling during expansion had seeped over the dough edges. It was observed that that side walls of the container had acted as a mold during expansion and that there was some adherence between interface contacting surfaces of the tarts. It was possible to remove the six tarts as a unit from the package and then gently break them apart along adhering confection edges. Each of the resulting tarts comprised two dough layers separated vertically at their edges by about 1" with the filling being visible and tending to protrude through the edges, and extending beyond the edges in some areas. Both dough layers were firmly adhered to the filling.

EXAMPLE 8

The process was generally the same as in Example 2. Instead of forming individual tarts, the dough was formed into two sheets with the particles of expandable filling being deposited as a layer between the dough sheets. This composite sheet was then rolled to a thickness of about 3/16", at which time the filling particles were pressed into the dough layers. This composite sheet was then baked in an oven and immediately thereafter it was scored along lines 1" apart extending at right angles to each other, whereby the filling was visible through the score lines. The scored sheet was then placed in a vacuum oven with a shelf temperature of 240° F. and a vacuum of 29" was immediately applied. After 1½ hours the vacuum was released and the product removed and permitted to cool to 80° F. At that time it was brittle and could be broken into individual units along the score lines. The filling particles had expanded between and into the dough layers and were clearly visible along the edges of the individual wafers. At some points the expanded filling protruded through the dough. The product was crisp and had good eating properties. It was found that wafer-like products made in this manner could be used as toaster tarts.

With reference to the product of Example 8 it was found that expanded confection extrusions could be formed as by weakening the upper dough layer in spots or regions, reducing the thickness of the upper layer, or incorporating some pieces of expandable material in the upper dough layer. In all instances, however, care should be taken to avoid direct contact between the expandable material and the pan during baking. It was also found that more than two dough layers could be employed with filling being deposited between adjacent layers.

EXAMPLE 9

The process was the same as in Example 8. However, before depositing the particles of filling, the filling was mixed with 1% of granulated agar agar. The product produced appeared to be substantially the same as that of Example 8 with a shape comparable to ravioli. However, this product was better adapted for use in casseroles and like food dishes. The agar agar served as a stabilizer and aided rehydration when rehydrated with other moist foods, as in a casserole.

FIGS. 2, 3 and 4 of the drawing show tarts that are representative of the products previously described. In FIG. 2 the tart is oblong with the upper and lower dough layers 11 and 12 having adhered margins 13. The expanded filling 14 has filled the interior of the tart. In FIG. 3 the dough layers 16 and 17 have pulled apart in some peripheral regions to expose the filling 18. In FIG. 4 the upper and lower dough layers 21 and 22 are spaced at their margins to provide a sandwich-like product in which the filling 23 is visible about the entire periphery.

What is claimed is:

1. A method for the manufacture of a food product comprising cooked dough together with an expanded confection filling, the method comprising forming an assembly including an expandable confection filling material in unexpanded form in direct contact with at least one surface of a mass of uncooked dough, heating the assembly to cook the dough and to soften the filling material, and before cooling subjecting the cooked dough and filling material to a partial vacuum to cause expansion of the filling and dehydration of the filling and dough, the expanded filling in the final product being bonded to the dough.

2. A method for the manufacture of a food product comprising cooked dough together with an expanded confection filling, the method comprising depositing an expandable confection filling material in unexpanded solid form upon a layer of uncooked dough, applying another layer of uncooked dough on top of the filling material, heating the assembly to cook the dough and to soften the filling material, and then immediately subjecting the cooked dough and filling material to a partial vacuum to cause expansion of the filling material and dehydration of the filling material and dough.

3. A method as in claim 2 in which the filling material is deposited upon the dough while in the form of a wafer.

4. A method as in claim 2 in which peripheral margins of the two dough layers are adhered together before cooking, the adherence being separated at least in part during the vacuum treatment whereby in the final product the expanded filling is visible in areas where the peripheral margins are separated.

5. A method as in claim 2 in which the confection material contains corn sugar solids.

6. A method as in claim 3 in which margins of the dough layers are adhered together before cooking and in which the filling during expansion serves to displace the second layer upwardly.

7. A method as in claim 5 in which the dough is cooked by baking and is then subjected, while still hot from baking, to the vacuum treatment whereby the dough layers are flexible and flex during expansion of the filling.

8. A method as in claim 5 in which after expansion the expanded filling is caused to subside by a predetermined amount, with the final filling having a volume more than twice the volume before expansion.

References Cited

UNITED STATES PATENTS

| 3,366,485 | 1/1968 | Moen et al. | 99—83 |
| 3,450,538 | 6/1969 | McKown et al. | 99—83 X |
| 3,477,851 | 11/1969 | Benson et al. | 99—83 |
| 3,676,151 | 7/1972 | Scharschmidt | 99—86 |

RAYMOND N. JONES, Primary Examiner

U.S. Cl. X.R.

426—344, 351